(12) United States Patent
Meyers

(10) Patent No.: US 9,428,120 B2
(45) Date of Patent: Aug. 30, 2016

(54) AUXILIARY MOBILE POWER SYSTEM

(71) Applicant: Diversified Products, LLC, Omaha, NE (US)

(72) Inventor: Chris Meyers, Omaha, NE (US)

(73) Assignee: Diversified Products, LLC, Omaha, NE (US)

( * ) Notice: Subject to any disclaimer, the term of this patent is extended or adjusted under 35 U.S.C. 154(b) by 110 days.

(21) Appl. No.: 14/208,109

(22) Filed: Mar. 13, 2014

(65) Prior Publication Data
US 2014/0261722 A1    Sep. 18, 2014

Related U.S. Application Data

(60) Provisional application No. 61/783,391, filed on Mar. 14, 2013.

(51) Int. Cl.
| | |
|---|---|
| *B60K 17/28* | (2006.01) |
| *B60K 25/00* | (2006.01) |
| *B60R 11/06* | (2006.01) |
| *B60R 9/06* | (2006.01) |
| *F04B 17/06* | (2006.01) |

(52) U.S. Cl.
CPC ............... *B60R 11/06* (2013.01); *B60R 9/06* (2013.01); *F04B 17/06* (2013.01); *Y10T 137/0396* (2015.04); *Y10T 137/85986* (2015.04)

(58) Field of Classification Search
CPC ... E02F 9/2225; E02F 9/2228; E02F 9/2232; E02F 9/2267
USPC .............................. 180/53.4, 367; 701/50, 53
See application file for complete search history.

(56) References Cited

U.S. PATENT DOCUMENTS

| | | | |
|---|---|---|---|
| 3,672,521 A | 6/1972 | Bauer et al. | |
| 4,132,132 A * | 1/1979 | Shaffer ................. | B60K 17/04 180/53.2 |
| 4,920,631 A | 5/1990 | Novak | |
| 4,949,805 A * | 8/1990 | Mather ................. | E02F 9/2025 180/324 |
| 5,056,615 A | 10/1991 | Duthie et al. | |
| 5,174,115 A * | 12/1992 | Jacobson ................. | E02F 9/22 180/324 |
| 5,460,304 A | 10/1995 | Porter et al. | |
| 5,590,731 A * | 1/1997 | Jacobson .............. | E02F 3/3414 180/306 |
| 5,711,391 A * | 1/1998 | Brandt ................. | E02F 3/3414 180/273 |
| 6,202,014 B1 * | 3/2001 | Brandt ................. | E02F 3/3414 172/12 |
| 6,659,709 B1 | 12/2003 | Anderson | |
| 6,820,781 B1 | 11/2004 | Gardner | |
| 6,923,285 B1 * | 8/2005 | Rossow ............... | E02F 3/3695 180/272 |

(Continued)

*Primary Examiner* — Toan To
(74) *Attorney, Agent, or Firm* — Suiter Swantz pc llo

(57) ABSTRACT

The present disclosure is directed to a hydraulic vehicle power system. The auxiliary mobile power system may be configured to supply power to at least one auxiliary function and a primary hydraulic system for a vehicle. The auxiliary mobile power system may include a hydraulic pump configured to provide hydraulic pressure to the at least one auxiliary function and the vehicle's primary hydraulic system. The auxiliary mobile power system may also include a control valve connected to the hydraulic pump. The control valve may be configured to control the hydraulic pressure to the at least one auxiliary function and the primary hydraulic system for the vehicle.

19 Claims, 4 Drawing Sheets

(56) References Cited

U.S. PATENT DOCUMENTS

| | | | |
|---|---|---|---|
| 7,509,758 B2 | 3/2009 | Nesseth | |
| 7,641,018 B2 * | 1/2010 | Bissontz | B60K 6/48 180/306 |
| 7,806,308 B2 | 10/2010 | Gunn | |
| 8,621,855 B2 * | 1/2014 | Meyeres | E02F 9/2004 60/327 |
| 8,862,274 B2 * | 10/2014 | Reiter | A01B 63/00 700/17 |
| 9,063,530 B2 * | 6/2015 | Lougheed | G05B 19/04 |
| 9,080,319 B2 * | 7/2015 | Oates, Jr. | E02F 3/96 |
| 2003/0037984 A1 | 2/2003 | McPherson et al. | |
| 2003/0136568 A1 | 7/2003 | McReynolds et al. | |
| 2006/0120848 A1 | 6/2006 | Guhr | |
| 2008/0152469 A1 | 6/2008 | Bates | |
| 2008/0223026 A1 | 9/2008 | Schuh et al. | |
| 2009/0078488 A1 | 3/2009 | Bock et al. | |
| 2009/0140574 A1 | 6/2009 | Gorman et al. | |
| 2011/0271562 A1 | 11/2011 | Nesseth | |
| 2012/0035815 A1 * | 2/2012 | Kawashima | B60K 6/48 701/50 |
| 2013/0213920 A1 | 8/2013 | Oliver et al. | |

\* cited by examiner

AUXILIARY MOBILE POWER SYSTEM

PRIORITY

The present application claims the benefit under 35 U.S.C. §119(e) of U.S. Provisional Application Ser. No. 61/783,391, filed Mar. 14, 2013, which is incorporated herein by reference.

CROSS REFERENCE TO RELATED APPLICATIONS

This application is related to co-pending and concurrently filed U.S. patent application No. Ser. No. 14/208,209 entitled "Tool Rack Attachment" which is incorporated herein by reference.

TECHNICAL FIELD

The present disclosure generally relates to the field of mobile power systems and more particularly to a system and method for providing auxiliary mobile power on a vehicle.

BACKGROUND

Vehicle operators may need to use various tools and subsystems while operating different vehicle types, or while working near the vehicle. Providing adequate power for the different tools and vehicle subsystems may be difficult.

Therefore, there exists a need for improved systems and methods for providing auxiliary mobile power to a vehicle.

SUMMARY

The present disclosure is directed to a mobile vehicle power system. The auxiliary mobile power system may be configured to supply power to at least one auxiliary function and a primary hydraulic system for a vehicle. The auxiliary mobile power system may include a hydraulic pump configured to provide hydraulic pressure to the at least one auxiliary function and the vehicle's primary hydraulic system. The auxiliary mobile power system may also include a control valve connected to the hydraulic pump. The control valve may be configured to control hydraulic pressure to the at least one auxiliary function and the primary hydraulic system for the vehicle.

The present disclosure is also directed to a method for supplying power to a primary hydraulic system on a vehicle and one or more auxiliary functions associated with the vehicle. The method may include the step of providing hydraulic pressure to the primary hydraulic system and the one or more auxiliary functions via a hydraulic pump connected to an engine of the vehicle. An additional step of the method may include controlling the hydraulic pressure to the one or more auxiliary functions and the primary hydraulic system via a control valve. The method may also include the step of controlling the hydraulic pressure to the one or more auxiliary functions via one or more auxiliary function control valves.

The present disclosure is also directed to an auxiliary mobile power system for supplying power to a primary hydraulic system and a plurality of auxiliary functions. The auxiliary mobile power system may include a hydraulic pump connected to the plurality of auxiliary functions and an engine of the vehicle. The hydraulic pump may be configured to provide hydraulic pressure to the plurality of auxiliary functions and a primary hydraulic system for the vehicle. The auxiliary mobile power system may also include a control valve connected to the hydraulic pump. The control valve may be configured to control the hydraulic pressure to the plurality of auxiliary functions and the primary hydraulic system for the vehicle. The auxiliary mobile power system may also include a plurality of auxiliary function control valves connected to the control valve. The plurality of auxiliary function control valves may be configured to control the hydraulic pressure to each auxiliary function of the plurality of auxiliary functions.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
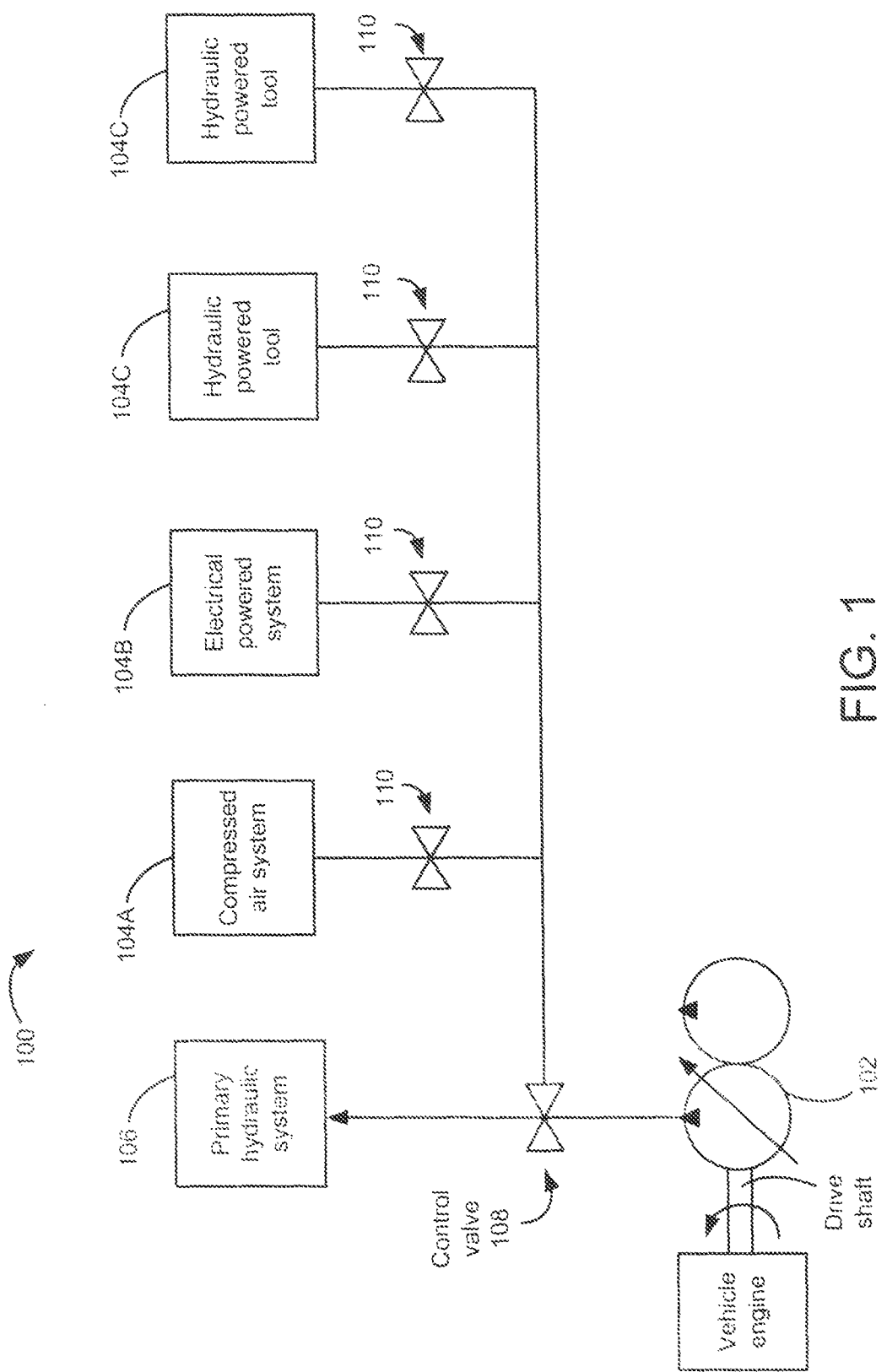
FIG. 1 is a diagram of an auxiliary mobile power system.

The present disclosure is directed to an auxiliary mobile power system 100 as shown in FIG. 1. The auxiliary mobile power system 100 may be configured to supply power to at least one auxiliary function 104. The auxiliary mobile power system 100 may include a hydraulic pump 102. The hydraulic pump 102 may be configured to provide hydraulic pressure to the at least one auxiliary function 104 and the vehicle's primary hydraulic system 106. The auxiliary mobile power system 100 may also include a control valve 108 connected to the hydraulic pump 102. The control valve 108 may be configured to control hydraulic pressure to the at least one auxiliary function 104 and the primary hydraulic system 106 for the vehicle.

The auxiliary mobile power system 100 may include hydraulic pump 102 connected to the vehicle engine and drive shaft. In one embodiment, the hydraulic pump 102 may include a displacement piston pump. The hydraulic pump 102 may be pressure and flow compensated to provide increased efficiency and to reduce heat buildup and fuel consumption. The hydraulic pump 102 may also provide on-demand oil delivery to each auxiliary function 104. The hydraulic pump 102 may also be configured to return to a minimum displacement condition when no demand is present. In one embodiment, the original gear pump in the vehicle may be replaced with a larger displacement piston pump when adapting an existing system to include the auxiliary mobile power system 100.

The auxiliary mobile power system 100 may also include a control valve 108. The control valve 108 may be configured to control hydraulic pressure to the at least one auxiliary function 104 and the primary hydraulic system 106 for the vehicle. The auxiliary mobile power system 100 may be configured to give priority flow from the hydraulic pump 102 to the primary hydraulic system 106 in one embodiment. This may provide uninterrupted operation of primary hydraulic system 106 functions, if desired. The auxiliary mobile power system 100 may also be configured to allow for simultaneous operation of one or more auxiliary functions 104 as well as at least partially simultaneous operation of primary hydraulic system 106 functions and one or more auxiliary functions 104.

In addition, each auxiliary function 104 of the auxiliary mobile power system 100 may also include an auxiliary function control valve 110. The auxiliary function control valves 110 may include individual valve cartridges in one embodiment. The auxiliary function control valves 110 may be configured to control hydraulic pressure and flow as well as actuation of each auxiliary function 104. The combination of the auxiliary function control valves 110 and the control valve 108 may provide selective control of the primary hydraulic system 106 as well as one or more auxiliary functions 104.

The auxiliary mobile power system 100 shown in FIG. 1 may be used to power on-board hydraulic driven auxiliary functions 104 of the vehicle. The auxiliary functions 104 may include different system types. For example, the auxiliary function 104 may include a compressed air system 104A, an electrical power system 104B, or a hydraulic powered tool 104C. The various auxiliary functions may include multiple system types or more than one system of the same type, such as two different hydraulic powered tools 104C. In the embodiment shown in FIG. 1, the auxiliary mobile power system 100 is configured to provide power to four auxiliary functions 104, including two hydraulic powered tools 104C, a compressed air system 104A, and an electrical powered system 104B.

The auxiliary mobile power system 100 shown in FIG. 1 may be used to provide power to auxiliary functions 104 such as compressed air system 104A. The compressed air system 104A may incorporate a tank-less air compressor which may be driven by the auxiliary mobile power system 100 to provide on-demand compressed air for operating a wide range of air tools. The air compressor system may be load sensitive, adjusting output to meet demand up to a maximum capacity. The compressed air system 104A may also include a cooling system configured for removing heat from the discharged air to improve operator comfort and/or system performance.

The auxiliary mobile power system 100 shown in FIG. 1 may also be used to provide power to auxiliary functions 104 such as an electrical powered system 104B. In some embodiments, the electrical powered system 104B may incorporate an electric generator which may be driven by auxiliary mobile power system 100 to provide on demand alternating current power for operating a wide range of electrical devices. The auxiliary mobile power system 100 may also incorporate Ground Fault Circuit Interrupter (GFCI) protection for increased operator safety.

The auxiliary mobile power system 100 shown in FIG. 1 may also be used to provide power to auxiliary functions 104 such as one or more hydraulic powered tools 104C. In one embodiment, this is implemented using two circuits capable of operating both 5 gallon per minute (GPM) and 10 GPM tools at a pressure of 2000 pounds per square inch (psi). The auxiliary tool circuits may be configured to operate both uni-directional and bi-directional tools.

Figure 2:
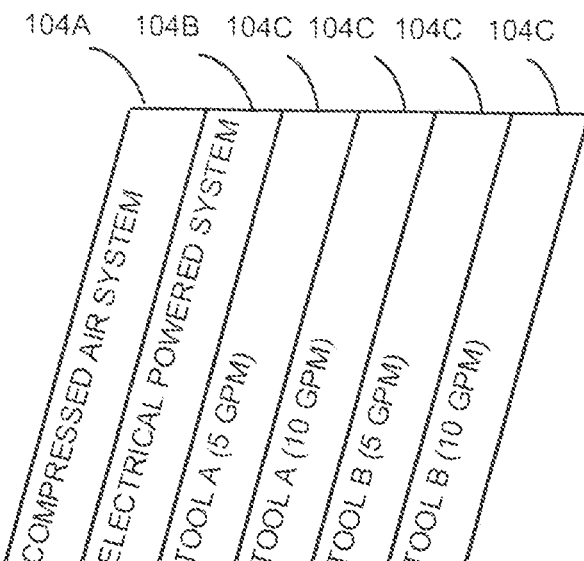
FIG. 2 is a chart including an example of the potential auxiliary functions that may be powered simultaneously using the auxiliary mobile power system.

An example of the potential auxiliary functions that may be powered simultaneously using the auxiliary mobile power system 100 is provided in FIG. 2. In the example shown in FIG. 2, the auxiliary mobile power system 100 may be implemented on a skid steer loader. Up to three auxiliary functions 104 may be powered simultaneously in the example provided. For instance, the compressed air system, electrical powered system, and a 5 GPM tool may all be powered simultaneously. Similarly, the auxiliary functions 104 may be powered individually, or different systems may be powered simultaneously as shown in FIG. 2.

The auxiliary mobile power system 100 may be implemented on any suitable vehicle employing a primary hydraulic system 106. In one embodiment, the auxiliary mobile power system 100 is implemented on a skid steer loader. In another embodiment, the auxiliary mobile power system 100 may be implemented in other hydraulic machinery, such as an excavator, backhoe, paver, tractor, dozer, or the like.

Figure 3:
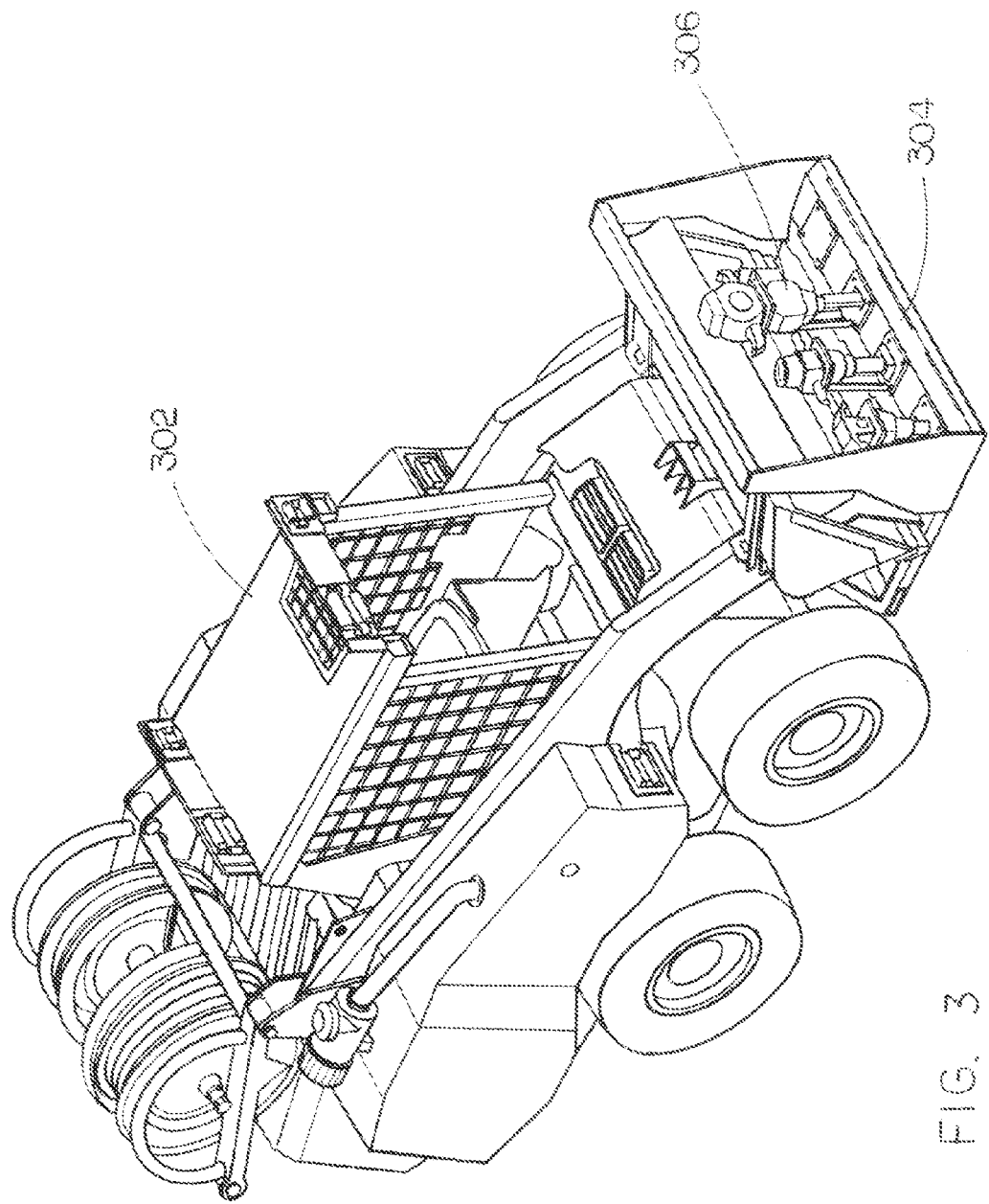
FIG. 3 is an example implementation of the auxiliary mobile power system in a skid steer loader including a tool rack attachment.

An example implementation of the auxiliary mobile power system 100 on a skid steer loader is provided in FIG. 3. In the embodiment shown in FIG. 3, the vehicle 302 implementing the auxiliary mobile power system 100 may include a tool rack attachment 304 for holding one or more of the auxiliary function 104 tools 306. In FIG. 3, the vehicle 302 is a skid steer loader including a tool rack attachment 304 for holding tools powered by the auxiliary mobile power system 100. Details relating to the tool rack attachment 304 are described in related U.S. Patent Application Ser. No. 14/208,209 entitled "Tool Rack Attachment."

Figure 4:
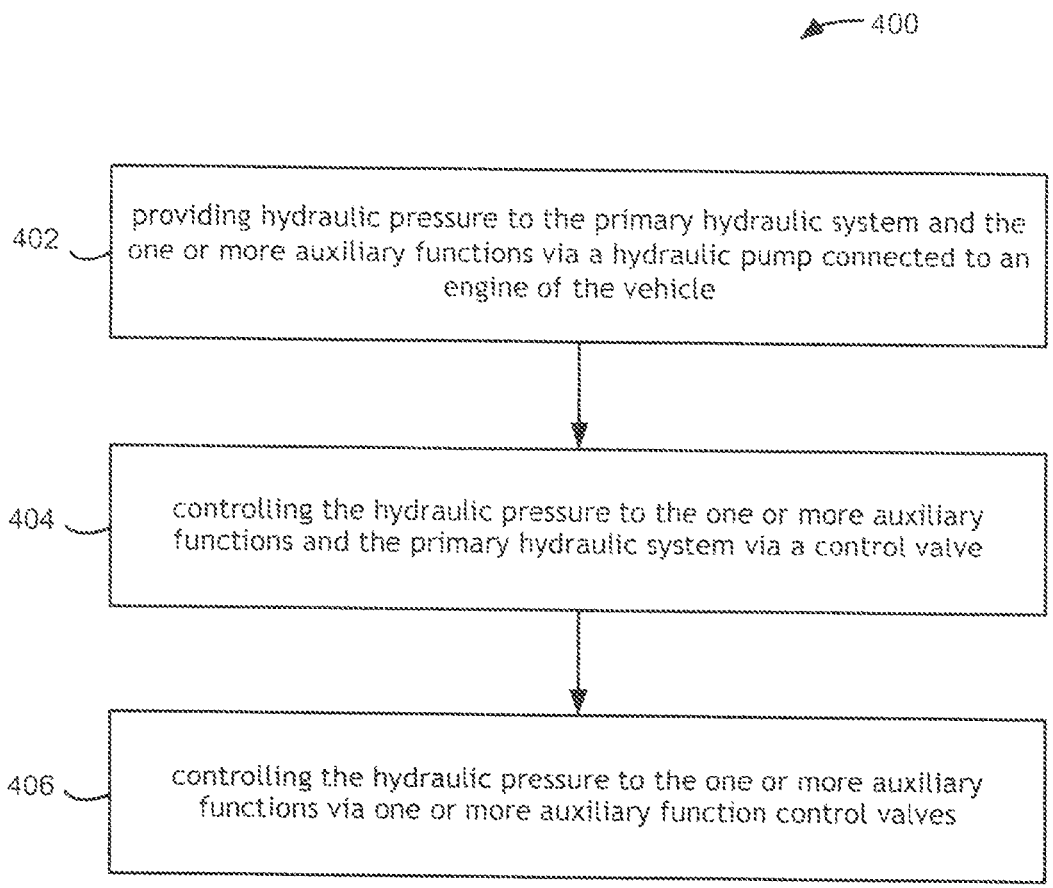
FIG. 4 is a flow diagram of a method for supplying power to a primary hydraulic system on a vehicle and one or more auxiliary functions associated with the vehicle.

The present disclosure is also directed to a method 400 for supplying power to a primary hydraulic system on a vehicle and one or more auxiliary functions, as shown in FIG. 4. The method 400 may be implemented by, for example, the auxiliary mobile power system 100 described in this disclosure and shown in FIGS. 1-3. The method 400 may include the step 402 of providing hydraulic pressure to the primary hydraulic system and the one or more auxiliary functions via a hydraulic pump connected to an engine of the vehicle. An additional step 404 of the method may include controlling the hydraulic pressure to the one or more auxiliary functions and the primary hydraulic system via a control valve. The method also includes the step 406 of controlling the hydraulic pressure to the plurality of auxiliary functions via a plurality of auxiliary function control valves 406.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A mobile auxiliary power system, comprising:
   a hydraulic pump configured to provide hydraulic pressure to at least one auxiliary function and a primary hydraulic system of a vehicle;
   a control valve configured to control hydraulic pressure to the at least one auxiliary function and the primary hydraulic system of the vehicle, and
   an auxiliary function control valve configured to control hydraulic pressure to the auxiliary function.

2. The auxiliary mobile power system as claimed in claim 1, wherein the at least one auxiliary function includes at least one of: a compressed air system, an electrical power system, or a hydraulic powered tool.

3. The auxiliary mobile power system as claimed in claim 1, wherein the vehicle includes a skid steer loader.

4. The auxiliary mobile power system as claimed in claim 1, wherein the hydraulic pump is a displacement piston pump.

5. An auxiliary mobile power system comprising:
   a hydraulic pump configured to provide hydraulic pressure to at least one auxiliary function and a primary hydraulic system of a vehicle; and
   a control valve configured to control hydraulic pressure to the at least one auxiliary function and the primary hydraulic system of the vehicle,
   wherein the auxiliary mobile power system is configured to provide power to the at least one auxiliary function and the primary hydraulic system at least partially simultaneously.

6. An auxiliary mobile power system comprising:
   a hydraulic pump configured to provide hydraulic pressure to at least one auxiliary function and a primary hydraulic system of a vehicle; and
   a control valve configured to control hydraulic pressure to the at least one auxiliary function and the primary hydraulic system of the vehicle,
   wherein the auxiliary mobile power system is configured to prioritize the supply of power to the primary hydraulic system.

7. An auxiliary mobile power system comprising:
   a hydraulic pump configured to provide hydraulic pressure to at least one auxiliary function and a primary hydraulic system of a vehicle; and
   a control valve configured to control hydraulic pressure to the at least one auxiliary function and the primary hydraulic system of the vehicle,
   wherein the auxiliary mobile power system is configured to provide power to at least two auxiliary functions simultaneously.

8. An auxiliary mobile power system comprising:
   a hydraulic pump configured to provide hydraulic pressure to at least one auxiliary function and a primary hydraulic system of a vehicle; and
   a control valve configured to control hydraulic pressure to the at least one auxiliary function and the primary hydraulic system of the vehicle,
   wherein the hydraulic pump is configured to provide on-demand power delivery to the at least one auxiliary function.

9. A method for supplying power to a primary hydraulic system on a vehicle and one or more auxiliary functions associated with the vehicle, the method comprising:
   providing hydraulic pressure to the primary hydraulic system and the one or more auxiliary functions via a hydraulic pump connected to an engine of the vehicle;
   controlling the hydraulic pressure to the one or more auxiliary functions and the primary hydraulic system via a control valve; and
   controlling the hydraulic pressure to the one or more auxiliary functions via one or more auxiliary function control valves.

10. The method as claimed in claim 9, wherein the one or more auxiliary functions includes at least one of: a compressed air system, an electrical power system, or a hydraulic powered tool.

11. The method as claimed in claim 9, wherein the power to the primary hydraulic system and the one or more auxiliary functions is supplied at least partially simultaneously.

12. The method as claimed in claim 9, wherein the vehicle includes a skid steer loader.

13. An auxiliary mobile power system for supplying power to a primary hydraulic system and a plurality of auxiliary functions, the auxiliary mobile power system comprising:
   a hydraulic pump, the hydraulic pump connected to the plurality of auxiliary functions and an engine of the vehicle, the hydraulic pump configured to provide hydraulic pressure to the plurality of auxiliary functions and an primary hydraulic system for the vehicle;
   a control valve, the control valve connected to the hydraulic pump, the control valve configured to control hydraulic pressure to the plurality of auxiliary functions and the primary hydraulic system for the vehicle; and
   a plurality of auxiliary function control, the plurality of auxiliary function control valves configured to control the flow of hydraulic pressure to each auxiliary function of the plurality of auxiliary functions.

14. The auxiliary mobile power system as claimed in claim 13, wherein the plurality of auxiliary functions includes at least two of: a compressed air system, an electrical power system, or a hydraulic powered tool.

15. The auxiliary mobile power system as claimed in claim 13, wherein the vehicle includes a skid steer loader.

16. The auxiliary mobile power system as claimed in claim 13, wherein the hydraulic pump is configured to provide on-demand power delivery to each auxiliary function of the plurality of auxiliary functions.

17. The auxiliary mobile power system as claimed in claim 13, wherein the hydraulic pump is a displacement piston pump.

18. The auxiliary mobile power system as claimed in claim 13, wherein the plurality of auxiliary functions includes: a compressed air system, an electrical power system, a first hydraulic powered tool, and a second hydraulic powered tool.

19. The auxiliary mobile power system as claimed in claim 18, wherein the auxiliary mobile power system is configured to supply power to three auxiliary functions simultaneously.

* * * * *